United States Patent
Kuhmann et al.

(10) Patent No.: US 11,504,939 B2
(45) Date of Patent: Nov. 22, 2022

(54) FLEXIBLE TUBE HAVING HIGH TEMPERATURE RESISTANCE

(75) Inventors: Karl Kuhmann, Duelmen (DE); Andreas Dowe, Borken (DE); Rainer Goering, Borken (DE)

(73) Assignee: EVONIK OPERATIONS GmbH, Essen (DE)

( * ) Notice: Subject to any disclaimer, the term of this patent is extended or adjusted under 35 U.S.C. 154(b) by 852 days.

(21) Appl. No.: 13/639,765

(22) PCT Filed: Mar. 29, 2011

(86) PCT No.: PCT/EP2011/054773
§ 371 (c)(1),
(2), (4) Date: Oct. 5, 2012

(87) PCT Pub. No.: WO2011/128201
PCT Pub. Date: Oct. 20, 2011

(65) Prior Publication Data
US 2013/0025734 A1  Jan. 31, 2013

(30) Foreign Application Priority Data

Apr. 13, 2010  (DE) .................. 10 2010 003 920.9

(51) Int. Cl.
| | |
|---|---|
| B32B 1/08 | (2006.01) |
| B32B 27/08 | (2006.01) |
| F16L 11/04 | (2006.01) |
| B32B 27/28 | (2006.01) |
| B32B 1/02 | (2006.01) |

(52) U.S. Cl.
CPC .............. *B32B 1/08* (2013.01); *B32B 27/08* (2013.01); *B32B 27/286* (2013.01); *B32B 27/288* (2013.01); *F16L 11/04* (2013.01); *B32B 2250/02* (2013.01); *B32B 2250/03* (2013.01); *B32B 2250/40* (2013.01); *B32B 2270/00* (2013.01); *B32B 2307/51* (2013.01); *B32B 2307/546* (2013.01); *B32B 2597/00* (2013.01)

(58) Field of Classification Search
CPC ......... F16L 11/04; F16L 11/045; B32B 27/32; B32B 27/34; B32B 27/288; B32B 1/08; B32B 27/08; B32B 27/286; Y10T 428/139
USPC ....... 428/34.1, 34.2, 35.7, 35.9, 36.9, 36.91; 138/125, 137, 140
See application file for complete search history.

(56) References Cited

U.S. PATENT DOCUMENTS

| | | | | |
|---|---|---|---|---|
| 3,343,976 A | * | 9/1967 | Matlock | C08J 7/18 156/153 |
| 3,537,729 A | * | 11/1970 | Burkett | F16L 47/18 285/368 |
| 4,394,705 A | * | 7/1983 | Blachman | F16L 11/127 138/103 |
| 5,106,540 A | * | 4/1992 | Barma | H01C 7/027 252/511 |
| 5,328,181 A | * | 7/1994 | Mistrater | B05C 3/09 198/803.7 |
| 5,422,418 A | | 6/1995 | Mai et al. | |
| 5,876,548 A | | 3/1999 | Strassel et al. | |
| 8,303,873 B2 | | 11/2012 | Dowe et al. | 264/173.19 |
| 2001/0021426 A1 | * | 9/2001 | Procida | F16L 9/123 428/35.8 |
| 2006/0182916 A1 | | 8/2006 | Dowe et al. | 428/36.9 |
| 2006/0183869 A1 | | 8/2006 | Dowe et al. | 525/340 |
| 2007/0036925 A1 | | 2/2007 | Braad | 428/36.9 |
| 2008/0083469 A1 | | 4/2008 | Cheng et al. | |
| 2009/0301594 A1 | | 12/2009 | Raudies et al. | 138/126 |
| 2010/0009106 A1 | | 1/2010 | Dowe et al. | 428/36.91 |
| 2010/0062202 A1 | * | 3/2010 | Procida | B32B 1/08 428/36.91 |
| 2010/0160008 A1 | * | 6/2010 | Topoulos | 455/575.1 |
| 2010/0300572 A1 | | 12/2010 | Dowe et al. | 138/140 |

(Continued)

FOREIGN PATENT DOCUMENTS

| | | |
|---|---|---|
| EP | 1 245 657 A1 | 10/2002 |
| EP | 1 505 099 A2 | 2/2005 |

(Continued)

OTHER PUBLICATIONS

U.S. Appl. No. 11/354,114, filed Feb. 15, 2006, US2006/0183869 A1, Dowe, et al.

(Continued)

*Primary Examiner* — Marc A Patterson
(74) *Attorney, Agent, or Firm* — Oblon, McClelland, Maier & Neustadt, L.L.P.

(57) ABSTRACT

A flexible pipe of multilayer structure with unbonded layers, where the pipe has an interior lining which comprises the following layers:
a) at least one layer of which the material is composed of a moulding composition based on a polymer selected from the group of:
 polyarylene ether ketone,
 polyphenyl sulphone,
 polyphenylene sulphide,
 polyarylene ether ketone/polyphenylene sulphide blend and
 semiaromatic polyamide, where from 5 to 100 mol % of the dicarboxylic acid content thereof derives from an aromatic dicarboxylic acid having from 8 to 22 carbon atoms, and which has a crystallite melting point Tm of at least 260° C.;
b) at least one layer of which the material is composed of a fluoropolymer moulding composition
can be operated at temperatures above 130° C. The pipe has particular suitability for offshore applications in the production of oil or of gas.

18 Claims, No Drawings

(56) References Cited

U.S. PATENT DOCUMENTS

| | | | |
|---|---|---|---|
| 2010/0300573 A1 | 12/2010 | Dowe et al. | 138/145 |
| 2011/0165358 A1 | 7/2011 | Dowe et al. | 428/36.9 |
| 2011/0209768 A1 | 9/2011 | Dowe et al. | 137/1 |
| 2012/0000541 A1 | 1/2012 | Dowe et al. | 137/1 |
| 2012/0006465 A1 | 1/2012 | Dowe et al. | 156/94 |
| 2012/0199317 A1 | 8/2012 | Hartmann et al. | |
| 2012/0275774 A1 | 11/2012 | Goering et al. | |
| 2012/0279577 A1 | 11/2012 | Goering et al. | |
| 2013/0171388 A1 | 7/2013 | Pawlik et al. | |

FOREIGN PATENT DOCUMENTS

| | | |
|---|---|---|
| EP | 1 860 134 A1 | 11/2007 |
| WO | 99 67560 | 12/1999 |
| WO | 2005 028198 | 3/2005 |
| WO | 2006 047774 | 5/2006 |
| WO | 2006 059220 | 6/2006 |
| WO | 2007 096589 | 8/2007 |
| WO | 2010 031844 | 3/2010 |

OTHER PUBLICATIONS

U.S. Appl. No. 11/354,100, filed Feb. 15, 2006, US2006/0182916 A1, Dowe, et al.
U.S. Appl. No. 12/374,832, filed Jan. 23, 2009, US2010/0009106 A1, Dowe, et al.
U.S. Appl. No. 13/238,587, filed Sep. 21, 2011, US2012/0006465 A1, Dowe, et al.
U.S. Appl. No. 12/676,752, filed Mar. 5, 2010, US2010/0300573 A1, Dowe, et al.
U.S. Appl. No. 12/675,122, filed Feb. 25, 2010, US2010/0300572 A1, Dowe, et al.
U.S. Appl. No. 13/202,338, filed Sep. 23, 2011, US2012/0000541 A1, Dowe, et al.
U.S. Appl. No. 13/128,297, filed May 9, 2011, US2011/0209768 A1, Dowe, et al.
U.S. Appl. No. 13/063,134, filed Mar. 9, 2011, US2011/0165358 A1, Dowe, et al.
U.S. Appl. No. 13/640,552, filed Oct. 11, 2012, Kuhmann, et al.
U.S. Appl. No. 13/640,679, filed Oct. 11, 2012, Kuhmann, et al.
U.S. Appl. No. 13/640,586, filed Oct. 11, 2012, Kuhmann, et al.
International Search Report dated Jul. 5, 2011 in PCT/EP11/54773 Filed on Mar. 29, 2011.
American Petroleum Institute, API Recommended Practice for Flexible Pipe, 17B, Third Edition, Mar. 2002.
U.S. Appl. No. 13/502,767, filed Apr. 23, 2012, US2012/0199317 A1, Hartmann, et al.
U.S. Appl. No. 13/457,634, filed Apr. 27, 2012, US2012/0275774 A1, Goering, et al.
U.S. Appl. No. 13/729,280, filed Dec. 28, 2012, US2013/0171388 A1, Pawlik, et al.
U.S. Appl. No. 13/463,061, filed May 3, 2012, US2012/0279577 A1, Goering, et al.
U.S. Appl. No. 14/224,807, filed Mar. 25, 2014, Franosch, et al.
U.S. Appl. No. 14/225,842, filed Mar. 26, 2014, Dowe, et al.

* cited by examiner

FLEXIBLE TUBE HAVING HIGH TEMPERATURE RESISTANCE

The present invention relates to a flexible pipe of multi-layer structure with unbonded layers. For simplicity, it is hereinafter termed an unbonded flexible pipe. This type of pipe has high resistance to the diffusion of gases from any conveyed fluid, and can therefore be used with particular advantage for conveying crude oil, natural gas, methanol, $CO_2$ and the like.

Unbonded flexible pipes are per se prior art. Pipes of this type comprise an interior lining, usually in the form of a plastics tube, as barrier to escape of the conveyed fluid, and also one or more reinforcing layers on the external side of the said interior lining. The unbonded flexible pipe can comprise additional layers, examples being one or more reinforcing layers on the inner side of the interior lining, in order to inhibit collapse of the interior lining under high external pressure. This type of interior reinforcement is usually termed a carcass. There can also be an exterior sheath present, in order to provide a barrier to penetration of liquid from the exterior environment into the reinforcing layers or other internal polymeric or metallic functional layers.

Typical unbonded flexible pipes are described by way of example in WO 01/61232, U.S. Pat. No. 6,123,114 and U.S. Pat. No. 6,085,799; they are also described in more detail in API Recommended Practice 17B, "Recommended Practice for Flexible Pipe", 3rd Edition, March 2002, and also in API Specification 17J, "Specification for Unbonded Flexible Pipe" 2nd Edition, November 1999.

The term "unbonded" in this context means that at least two of the layers, inclusive of reinforcing layers and plastics layers, have not been designed with bonding between the same. In practice, the pipe comprises at least two reinforcing layers which, over the length of the pipe, have been bonded to one another either directly or indirectly, i.e. by way of further layers. This makes the pipe sufficiently flexible that it can be rolled up for transport purposes.

Various embodiments of these unbonded flexible pipes are used in offshore applications, and also in various onshore applications, for transporting liquids, gases and slurries. By way of example, they can be used for transporting fluids where, over the length of the pipe, there is very high, or very different, water pressure, for example in the form of ascending pipelines which run from the sea bed up to equipment at or in the vicinity of the surface of the sea, or else in general terms in the form of pipes for transporting liquids or gases between various items of equipment, or in the form of pipes laid at great depth on the sea bed, or in the form of pipes between items of equipment in the vicinity of the surface of the sea.

In conventional flexible pipes, the reinforcing layer(s) is/are composed mostly of helically arranged steel wires, steel profiles or steel strip, and the individual layers here can have various winding angles relative to the axis of the pipe. Alongside this, there are also embodiments in which at least one reinforcing layer, or all of the reinforcing layers, is/are composed of fibres, for example of glass fibres, for example in the form of fibre bundles or of fibre textiles, generally embedded into a polymeric matrix.

In the prior art, the interior lining is usually composed of a polyolefin, such as polyethylene, which can also have been crosslinked, or of a polyamide, such as PA11 or PA12, or of polyvinylidene fluoride (PVDF).

Polyethylene has the disadvantage of swelling markedly in contact with crude oil or natural gas, and then undergoing creep. The non-polar fluid conveyed also permeates outwards to a major extent through the polyethylene wall. Polyethylene is therefore generally not used for lines with direct contact with product streams, but instead is mainly used for what are known as water injection lines.

Polyamides such as PA11 or PA12 have very good suitability as material for the interior lining, because they have very good mechanical properties and excellent resistance to hydrocarbons and exhibit only slight swelling. The particular suitability of polyamides has been described in detail in the publication OTC 5231 "Improved Thermoplastic Materials for Offshore Flexible Pipes". However, they can be used only up to at most about 70° C., since the process water present in the crude oil or, respectively, natural gas causes increasing hydrolysis at higher temperatures. The said hydrolysis reduces the molecular weight of the polyamide so severely as to cause considerable impairment of mechanical properties and finally failure of the pipe. API 17TR2 describes a detailed test procedure for determining hydrolysis properties for PA11, and this can be applied equally to PA12.

PVDF is used up to at most 130° C. After modification, it is stiff with low compressive deformability even at relatively high temperatures up to about 130° C. However, blistering and microfoaming are likely to occur at temperatures above 130° C. with a decrease in internal pressure. PVDF undergoes major swelling extending to about 25% in particular in supercritical $CO_2$; the blistering that occurs with pressure decrease results from the good permeation barrier, which implies poor diffusion. Local gas desorption occurs within the layer here, whereupon the cohesive strength of the material is exceeded.

In many instances, the temperatures of crude oil or natural gas emerging from the source are markedly above 130° C. If flexible pipelines are to be used for accessing sources of this type, an upstream step of the process is needed to cool the fluid. It would therefore be desirable to have unbonded flexible pipes available which can also be used at relatively high temperatures, so that the said step of the process can be omitted.

WO 2008/125807 describes a flexible pipe which can by way of example convey hot methanol in an umbilical and which comprises an interior layer made of PEEK or polyphenylene sulphide. The internal diameter of the said pipe is in the range from 4 to 500 mm, while the thickness of the PEEK layer is from 0.7 to 5 mm. However, since unbonded flexible pipes need a layer thickness of at least 2 mm and typically from 3 to 20 mm in order to provide the necessary mechanical stability of the layer for installation and handling, the known high stiffness of PEEK here would give a pipe which does not have adequate flexibility to give an acceptable radius of winding onto a drum.

WO 99/67561 describes another embodiment of a flexible multilayer pipe with an internal PEEK tube. The pipe is composed of layers of polymer and of textile, and the design has all of these bonded to one another along the entire length of the pipe; the typical wall thickness of the internal tube is from 6 to 12 mm.

WO 2006/047774 describes a multilayer pipe with a layer composed of a semiaromatic polyamide.

U.S. Pat. No. 5,876,548 describes a flexible metal pipe in which an elastomer layer has been applied to a carcass, and a layer made of a shrinkable polymer has been applied thereover; PEEK is one of a wide variety of possibilities mentioned for this purpose.

WO 2005/028198 describes an unbonded flexible pipe in which the interior lining is composed of a relatively thick polymer layer and of a relatively thin film with barrier properties. Two extensive identical lists are given for the materials of the relatively thick polymer layer and of the film; the film can moreover be composed of metal. Both lists mention PEEK, PEKK and polyphenylene sulphide (PPS).

The pipe of U.S. Pat. No. 5,934,335 comprises a layer which can be composed of PFA. However, PFA creeps markedly at relatively high temperatures and, when subject to pressure in certain directions, fills the intermediate spaces between the articulated regions of the carcass or the externally adjacent reinforcing layer, thus considerably reducing the flexibility of the pipe. Moreover, stress cracks form in the deformed regions, and can lead to destruction of the interior lining. U.S. Pat. No. 5,934,335 therefore recommends charging an elastomer to the intermediate spaces associated with the carcass.

The object of the invention consists in providing an interior lining which is stable at relatively high operating temperatures, for example above 130° C., and which moreover does not excessively reduce the flexibility of the pipe.

The object is achieved via an unbonded flexible pipe where the pipe has an interior lining which comprises the following layers:

a) at least one layer of which the material is composed of a moulding composition based on a polymer selected from the following group:
polyarylene ether ketone,
polyphenyl sulphone,
polyphenylene sulphide,
polyarylene ether ketone/polyphenylene sulphide blend and
semiaromatic polyamide, where from 5 to 100 mol % of the dicarboxylic acid content thereof derives from an aromatic dicarboxylic acid having from 8 to 22 carbon atoms, and which has a crystallite melting point $T_m$ of at least 260° C., preferably at least 270° C. and particularly preferably at least 280° C., determined according to ISO 11357 in the 2nd heating procedure;

b) at least one layer of which the material is composed of a fluoropolymer moulding composition.

In the simplest case, the interior lining is a two-layer lining, but preferably a three-layer lining having the following layer sequence: a/b/a. However, it can moreover also comprise further layers.

In the case of an unbonded flexible pipe which comprises a carcass, the innermost layer of the lining is preferably a layer according to a); this is then followed externally by a layer according to b) and then optionally another layer according to a).

In the case of an unbonded flexible pipe which comprises no carcass, the innermost layer of the lining can be a layer according to b); this is then followed externally by a layer according to a). However, it is preferable here that there is a layer according to a) respectively located on both sides of the layer b), since this protects the material of the layer according to b) from the conveyed fluid. This provides effective prevention of, for example, blistering.

In the case of the said three-layer sandwich structure, the two layers according to a) can be composed of different materials. By way of example, the exterior layer according to a) is composed of the relatively inexpensive polyamide or polyphenylene sulphide, while the interior layer according to a) is composed of polyarylene ether ketone, polyphenylene sulphide or a polyarylene ether ketone/polyphenylene sulphide blend.

There can be adhesion promoters bonding the individual layers to one another; suitable adhesion promoters are known to the person skilled in the art. A certain degree of initial adhesion facilitates production of the unbonded flexible pipe; however, layer adhesion is not a vital requirement for operation. In the event that gases accumulate between unbonded layers during operation, these can be dissipated by suitable design measures. However, accumulation of gases can be markedly reduced in the preferred embodiment when the layer according to b) has been arranged on the inside.

In one possible embodiment, there is a carcass located on the inner side of the interior lining. Carcasses of this type and their design are prior art. In another possible embodiment, the unbonded flexible pipe comprises no carcass, especially when it is not intended for operation under high external pressures.

The unbonded flexible pipe moreover comprises, on the external side of the interior lining, one or more reinforcing layers, which are usually composed of helically arranged steel wires, steel profiles, or steel strip. The design of the said reinforcing layers is prior art. The structure of at least one of the said reinforcing layers is preferably such that the layer withstands the internal pressure, and the structure of at least one other of the said reinforcing layers is such that the layer withstands tensile forces. The reinforcing layer(s) can be followed by an exterior sheath, usually in the form of a tube or hose made of a thermoplastic moulding composition or of an elastomer.

The polyarylene ether ketone of the layer according to a) comprises units of the formulae

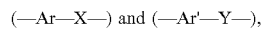
(—Ar—X—) and (—Ar'—Y—), where Ar and Ar' are a divalent aromatic moiety, preferably 1,4-phenylene, 4,4'-biphenylene, or else 1,4-, 1,5- or 2,6-naphthylene. X is an electron-withdrawing group, preferably carbonyl or sulphonyl, while Y is another group, such as O, S, $CH_2$, isopropylidene or the like. At least 50%, preferably at least 70% and particularly preferably at least 80%, of the groups X here are a carbonyl group, while at least 50%, preferably at least 70% and particularly preferably at least 80% of the groups Y are composed of oxygen.

In the preferred embodiment, 100% of the groups X are composed of carbonyl groups and 100% of the groups Y are composed of oxygen. In the said embodiment, the polyarylene ether ketone can by way of example be a polyether ether ketone (PEEK; formula I), a polyether ketone (PEK; formula II), a polyether ketone ketone (PEKK; formula III) or a polyether ether ketone ketone (PEEKK; formula IV), but other arrangements of the carbonyl groups and oxygen groups are naturally also possible.

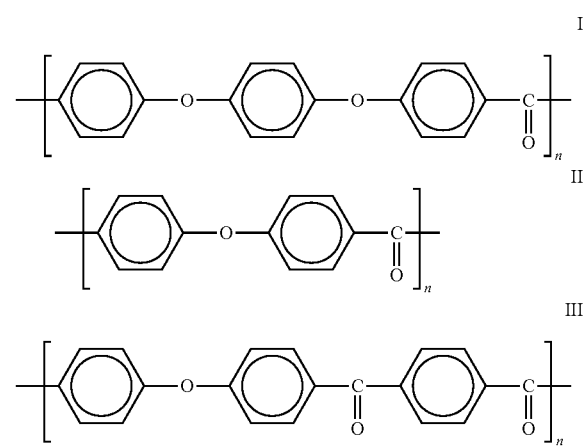

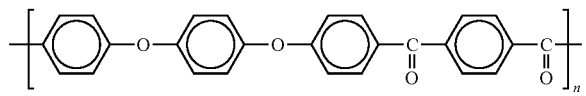

The polyarylene ether ketone is semicrystalline, and this is discernible by way of example in DSC analysis through appearance of a crystallite melting point $T_m$, which in most instances is of the order of magnitude of 300° C. or thereabove.

Polyphenyl sulphone (PPSU) is produced by way of example with trade mark Radel® by Solvay Advanced Polymers. It can be produced from 4,4'-dihydroxybiphenyl and 4,4'-dichlorodiphenyl sulphone via nucleophilic substitution.

The polyphenylene sulphide comprises units of the formula

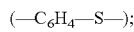

and is preferably composed of at least 50% by weight, at least 70% by weight or at least 90% by weight of the said units. The remaining units can be those stated above for the case of the polyarylene ether ketone, or tri- or tetrafunctional branching-point units, where these result from concomitant use of, for example, trichlorobenzene or tetrachlorobenzene during synthesis. A wide variety of grades of, or moulding compositions comprising, polyphenylene sulphide are commercially available.

In the case of the polyarylene ether ketone/polyphenylene sulphide blends, the two components can be present in any conceivable mixing ratio, and the entire range of composition is therefore covered, from pure polyarylene ether ketone extending to pure polyphenylene sulphide. The blend generally comprises at least 0.01% by weight of polyarylene ether ketone and, respectively, at least 0.01% by weight of polyphenylene sulphide. In one preferred embodiment the blend comprises at least 50% by weight of polyarylene ether ketone.

The polyamide can be produced from a combination of diamine and dicarboxylic acid, optionally with addition of an w-aminocarboxylic acid or the corresponding lactam. Examples of suitable types are PA66/6T, PA6/6T, PA6T/MPMDT (MPMD means 2-methylpentamethylenediamine), PA9T, PA10T, PA11T, PA12T, PA14T and also copolycondensates of these last-mentioned types with an aliphatic diamine and with an aliphatic dicarboxylic acid or with an ω-aminocarboxylic acid or a lactam.

The moulding composition of the layer according to a) can comprise the conventional auxiliaries and additives and also optionally further polymers, examples being, in the case of the polyarylene ether ketone, fluoropolymers, such as PFA (a copolymer of tetrafluoroethylene and perfluorinated vinyl methyl ether), polyimide, polyetherimide, LCP, for example liquid-crystalline polyester, polysulphone, polyether sulphone, polyphenyl sulphone, polybenzimidazole (PBI) or other high-temperature-resistant polymers, and examples in the case of the polyphenylene sulphide being copolymers and, respectively, terpolymers of ethylene with polar comonomers and, in the case of the semiaromatic polyamide, an aliphatic polyamide and/or an impact modifier. The polyamide moulding composition can also by way of example comprise a hydrolysis stabilizer. The proportion of polyarylene ether ketone, polyphenylene sulphide, polyarylene ether ketone/polyphenylene sulphide blend or, respectively, semiaromatic polyamide in the moulding composition is at least 50% by weight, preferably at least 60% by weight, particularly preferably at least 70% by weight, with particular preference at least 80% by weight and very particularly preferably at least 90% by weight.

The fluoropolymer of the layer according to b) can by way of example be a polyvinylidene fluoride (PVDF), an ethylene-tetrafluoroethylene copolymer (ETFE), an ETFE modified with the aid of a tercomponent, such as propene, hexafluoropropene, vinyl fluoride or vinylidene fluoride (an example being EFEP), an ethylene-chlorotrifluoroethylene copolymer (ECTFE), a polychlorotrifluoroethylene (PCTFE), a chlorotrifluoroethylene-perfluorinated alkyl vinyl ether-tetrafluoroethylene copolymer (CPT), a tetrafluoroethylene-hexafluoropropene-vinylidene fluoride copolymer (THV), a tetrafluoroethylene-hexafluoropropene copolymer (FEP) or a tetrafluoroethylene-perfluorinated alkyl vinyl ether copolymer (PFA). It is also possible to use copolymers which are based on vinylidene fluoride and which comprise up to 40% by weight of other monomers, such as trifluoroethylene, chlorotrifluoroethylene, ethylene, propene and hexafluoropropene.

The moulding composition of the layer according to b) can comprise the usual auxiliaries and additives. The proportion of fluoropolymer is at least 50% by weight, preferably at least 60% by weight, particularly preferably at least 70% by weight, with particular preference at least 80% by weight and very particularly preferably at least 90% by weight.

The internal diameter of the interior lining is generally at least 30 mm, at least 40 mm, at least 50 mm or at least 60 mm, and also at most 900 mm, at most 800 mm, at most 700 mm or at most 620 mm; however, it can in individual cases also be greater or less than those values. The total wall thickness of the interior lining is generally at least 2 mm, at least 2.5 mm, at least 3 mm, at least 4 mm or at least 5 mm, and also at most 50 mm, at most 40 mm, at most 30 mm, at most 25 mm, at most 20 mm or at most 16 mm; again, it can in individual cases also be greater or less than those values. The thickness of a layer according to a) is from 0.1 to 10 mm and preferably from 0.2 to 8 mm.

The interior lining is produced according to the prior art by coextrusion, by helical extrusion of the individual layers or optionally by winding of tapes.

This type of unbonded flexible pipe can be operated advantageously at surface temperatures above 130° C. up to the range around 200° C. and optionally thereabove. The use of the layer according to a) minimizes the risk that material of the interior lining will creep into the intermediate spaces between the articulated regions of the carcass or the reinforcing layer that follows externally. The flexibility of the pipe is therefore retained; no stress cracks form in deformed regions, where these could lead to destruction of the interior lining.

The invention claimed is:

1. A flexible pipe having a multilayer structure with unbonded layers, where the pipe comprises an interior lining comprising unbonded layers (a) and (b):
   a) at least one layer comprising a molding composition, wherein the molding composition comprises a polymer selected from the group consisting of:
   a polyarylene ether ketone,
   polyphenyl sulfone,
   polyphenylene sulfide,
   a blend of a polyarylene ether ketone and polyphenylene sulfide, and semiaromatic polyamide, where from 5 to 100 mol% of a dicarboxylic acid content thereof derives from an aromatic dicarboxylic acid having from 8 to 22 carbon atoms, and which has a crystallite melting point Tm of at least 260° C., determined according to ISO 11357;

b) at least one layer comprising a fluoropolymer molding composition;

wherein the flexible pipe is operable at 200° C. to convey a fluid selected from the group consisting of crude oil, natural gas, methanol, and super critical carbon dioxide and resistant to the diffusion of gases from the conveying fluid;

wherein the flexibility of the pipe when subjected to a temperature of 130° C. is retained when the pipe is subjected to a temperature of 200° C.;

wherein the flexible pipe does not form stress cracks in deformed regions when the pipe is subjected to a temperature of 200° C.; and wherein the interior lining is an unbonded three-layer lining having a layer sequence a/b/a and all of the a and b layers in the unbonded three-layer sequence a/b/a are unbonded to each other.

2. The flexible pipe of claim 1, wherein the interior lining is a tube.

3. The flexible pipe of claim 1, further comprising, alongside the interior lining, one or more unbonded layers selected from the group consisting of
an internal carcass,
one or more external reinforcing layers, and
an exterior sheath.

4. The flexible pipe of claim 1, wherein the crystalline melting point Tm is at least 270° C.

5. The flexible pipe of claim 1, wherein the crystalline melting point Tm is at least 280° C.

6. The flexible pipe of claim 1, wherein an exterior layer (a) comprises polyphenylene sulfide.

7. The flexible pipe of claim 1, wherein an interior layer (a) comprises the polyarylene ether ketone, polyphenylene sulfide, or a blend of the polyarylene ether ketone and polyphenylene sulfide.

8. The flexible pipe of claim 1, wherein an exterior layer (a) comprises polyphenylene sulfide, and an interior layer (a) comprises the polyarylene ether ketone, polyphenylene sulfide, or a blend of the polyarylene ether ketone and polyphenylene sulfide.

9. The flexible pipe of claim 1, wherein the molding composition comprises the polyarylene ether ketone.

10. The flexible pipe of claim 9, wherein the polyarylene ether ketone comprises units of the formulae

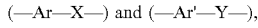

(—Ar—X—) and (—Ar'—Y—), wherein
Ar and Ar' are each independently a divalent aromatic moiety selected from the group consisting of 1,4-phenylene, 4,4'-biphenylene, 1,4-naphthylene, 1,5-naphthylene and 2,6-naphthylene;

X is carbonyl or sulfonyl; and
Y is selected from the group consisting of O, S, CH$_2$, and isopropylidene.

11. The flexible pipe of claim 10, wherein at least 50% of the units of the formula (—Ar—X—) have X groups which are carbonyl groups, and at least 50% of the units of the formula (—Ar—Y—) have Y groups which are O groups.

12. The flexible pipe of claim 10, wherein at least 70% of the units of the formula (—Ar—X—) have X groups which are carbonyl groups, and at least 70% of the units of the formula (—Ar—Y—) have Y groups which are O groups.

13. The flexible pipe of claim 10, wherein at least 80% of the units of the formula (—Ar—X—) have X groups which are carbonyl groups, and at least 80% of the units of the formula (—Ar—Y—) have Y groups which are O groups.

14. The flexible pipe of claim 9, wherein the polyarylene ether ketone has a formula selected from the group consisting of formulae I-IV:

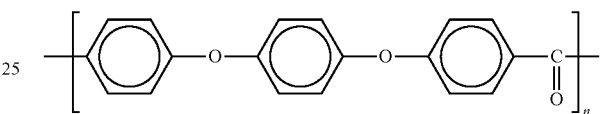

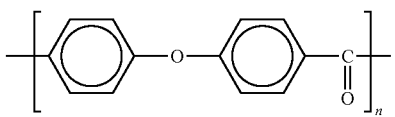

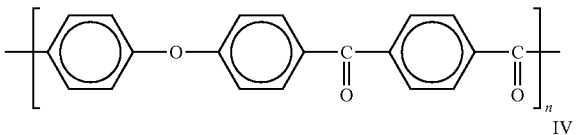

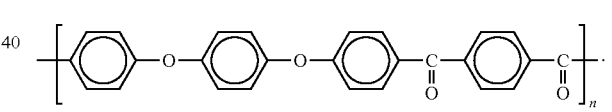

15. The flexible pipe of claim 1, wherein the interior lining has a total wall thickness of 2 to 50 mm.

16. The flexible pipe of claim 1, wherein the interior lining has a total wall thickness of 5 to 16 mm.

17. The flexible pipe of claim 1, wherein each layer (a) has a thickness of 0.1 to 10 mm.

18. The flexible pipe of claim 1, wherein each layer (a) has a thickness of 0.2 to 8 mm.

* * * * *